United States Patent
Sharda et al.

(10) Patent No.: US 9,652,027 B2
(45) Date of Patent: May 16, 2017

(54) THREAD SCHEDULING BASED ON PERFORMANCE STATE AND IDLE STATE OF PROCESSING UNITS

(71) Applicant: Microsoft Technology Licensing, LLC, Redmond, WA (US)

(72) Inventors: Vishal Sharda, Redmond, WA (US); Bruce Lee Worthington, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/676,676

(22) Filed: Apr. 1, 2015

(65) Prior Publication Data
US 2016/0291672 A1    Oct. 6, 2016

(51) Int. Cl.
| G06F 9/46 | (2006.01) |
|---|---|
| G06F 1/00 | (2006.01) |
| G06F 11/30 | (2006.01) |
| G06F 1/32 | (2006.01) |
| G06F 9/48 | (2006.01) |
| G06F 9/50 | (2006.01) |

(52) U.S. Cl.
CPC ........... *G06F 1/329* (2013.01); *G06F 9/4893* (2013.01); *G06F 9/5094* (2013.01); *G06F 1/3203* (2013.01); *Y02B 60/144* (2013.01)

(58) Field of Classification Search
None
See application file for complete search history.

(56) References Cited

U.S. PATENT DOCUMENTS

| 6,901,522 B2 | 5/2005 | Buch |
|---|---|---|
| 7,093,147 B2 | 8/2006 | Farkas et al. |
| 8,010,822 B2 | 8/2011 | Marshall et al. |
| 8,321,703 B2 | 11/2012 | Berard et al. |

(Continued)

OTHER PUBLICATIONS

Ben-Ltzhak, et al., "Performance and Power Aware CMP Thread Allocation Modeling", In Proceedings of the 5th international conference on High Performance Embedded Architectures and Compilers, Jan. 25, 2010, 22 pages.

(Continued)

*Primary Examiner* — Bing Zhao
(74) *Attorney, Agent, or Firm* — Workman Nydegger

(57) ABSTRACT

A computing system having a plurality of processing units configured to perform work by having threads assigned to the processing units. A thread scheduler is coupled to the plurality of processors and configured to schedule threads to the processing units. A power manager is coupled to the thread scheduler and controls performance states or idle states of the processing units. The thread scheduler maintains information about current performance state or idle state per processing unit. The information includes a multi-level description of the processing units in the computing system. The multi-level description includes three or more different entry values of different levels for performance state or idle state for processing units. The power manager provides the multi-level description of the processing units to the thread scheduler, which is configured to schedule threads to the processing units based on the multi-level description.

20 Claims, 2 Drawing Sheets

(56) References Cited

U.S. PATENT DOCUMENTS

| | | | |
|---|---|---|---|
| 8,954,977 B2* | 2/2015 | Song | G06F 1/3203 718/104 |
| 9,274,585 B2* | 3/2016 | Breternitz | G06F 1/3206 |
| 2005/0050369 A1 | 3/2005 | Gary | |
| 2009/0307698 A1 | 12/2009 | Khatri et al. | |
| 2009/0320031 A1 | 12/2009 | Song | |
| 2011/0138388 A1 | 6/2011 | Wells et al. | |
| 2012/0144144 A1 | 6/2012 | Worthington et al. | |
| 2012/0272235 A1 | 10/2012 | Fahrig | |
| 2012/0284729 A1* | 11/2012 | Sharda | G06F 9/5094 718/104 |

OTHER PUBLICATIONS

Esaxe, "Power Optimized Thread Placement", Published on: Mar. 30, 2009 Available at: logs.oracle.com/esaxe/entry/power_optimized_thread_placement.

Bautista, et al., "A Simple Power-Aware Scheduling for Multicore Systems when Running Real-Time Applications", In IEEE International Symposium on Parallel and Distributed Processing, Apr. 14, 2008, 8 pages.

Cong, et al., "Energy-Efficient Scheduling on Heterogeneous Multi-Core Architectures", In Proceedings of the ACM/IEEE international symposium on Low power electronics and design, Jul. 30, 2012, 6 pages.

"International Search Report & Written Opinion Issued in PCT Application No. PCT/US2016/024401", Mailed Date: Jun. 2, 2016, 11 Pages.

"Second Written Opinion Issued in PCT Application No. PCT/US2016/024401", Mailed Date: Feb. 15, 2017, 7 Pages.

* cited by examiner

THREAD SCHEDULING BASED ON PERFORMANCE STATE AND IDLE STATE OF PROCESSING UNITS

BACKGROUND

Background and Relevant Art

Computers and computing systems have affected nearly every aspect of modern living. Computers are generally involved in work, recreation, healthcare, transportation, entertainment, household management, etc.

Modern processors used in computing systems offer multiple performance states (e.g., Advanced Configuration and Power Interface (ACPI) P-states) and idle states (e.g., ACPI C-states) that can be managed by an operating system to attain higher energy efficiency or energy savings. Some power states may have a nontrivial "exit latency" associated with bringing the processor out of a low power idle state so that it can resume work.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing system comprising a plurality of processing units. The method includes acts for scheduling threads on the plurality of processing units. The method includes, for a particular processing unit model, obtaining at least one of a multi-level mapping of three or more performance states to performance levels and power requirements of processing units of the particular processing unit model or a multi-level mapping of three or more idle states to exit latencies for exiting from idle states and power requirements at idle states of the particular processing unit model. The method further includes, for each processing unit in the plurality of processing units of the particular model, obtaining information about at least one of current performance state or idle state per processing unit to create a multi-level description of the processing units in the computing system. The multi-level description comprises three or more different entry values for performance state or idle state for processing units in the plurality of processing units. The method further includes scheduling a thread from a thread scheduler to a processing unit based on the multi-level description.

Another embodiment includes a computing system having a plurality of processing units configured to perform work by having threads assigned to the processing units. The system further includes a thread scheduler coupled to the plurality of processors. The thread scheduler is configured to schedule threads to the processing units in the plurality of processing units. The system further includes a power manager coupled to the thread scheduler. The power manager is configured to control at least one of performance states or idle states of the processing units. The thread scheduler maintains information about at least one of current performance state or idle state per processing unit. The information includes a multi-level description of the processing units in the computing system. The multi-level description includes three or more different entry values of different levels for performance state or idle state for processing units in the plurality of processing units. The power manager is coupled to the thread scheduler for providing the multi-level description of the processing units in the computing system to the thread scheduler. The thread scheduler is configured to schedule threads to the processing units in the plurality of processing units based on the multi-level description of the processing units in the computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

As noted above, modern processors used in computing systems offer multiple performance states (e.g., ACPI P-states) and idle states (e.g., ACPI C-states) that can be managed by an operating system to attain higher performance, energy efficiency or energy savings. Some power states may have a nontrivial "exit latency" associated with bringing the processor out of a low power state so that it can resume work. However, traditionally, when selecting an idle processor on which to schedule a thread (where a thread is an elemental sequence of instructions) ready for execution, a thread scheduler does not take detailed performance state or idle state information into account. Without this information, the scheduler may make an inefficient decision from a power and possibly also a performance perspective.

In contrast, some embodiments illustrated herein may be configured such that when selecting a processor on which to schedule a thread ready for execution, a thread scheduler can consider multi-level idle states and/or a multi-level performance states of processors. Processors that are in deeper idle states (e.g., with exit latencies greater than a certain threshold or with power savings greater than a certain threshold) can be given an appropriately-scaled negative weighting factor when selecting a processor on which to schedule a thread. Similarly, knowledge of the performance states of processors can be utilized by a thread scheduler in conjunction with information about a ready thread's execution characteristics to choose a processor with an appropriate current performance state.

Figure 1:
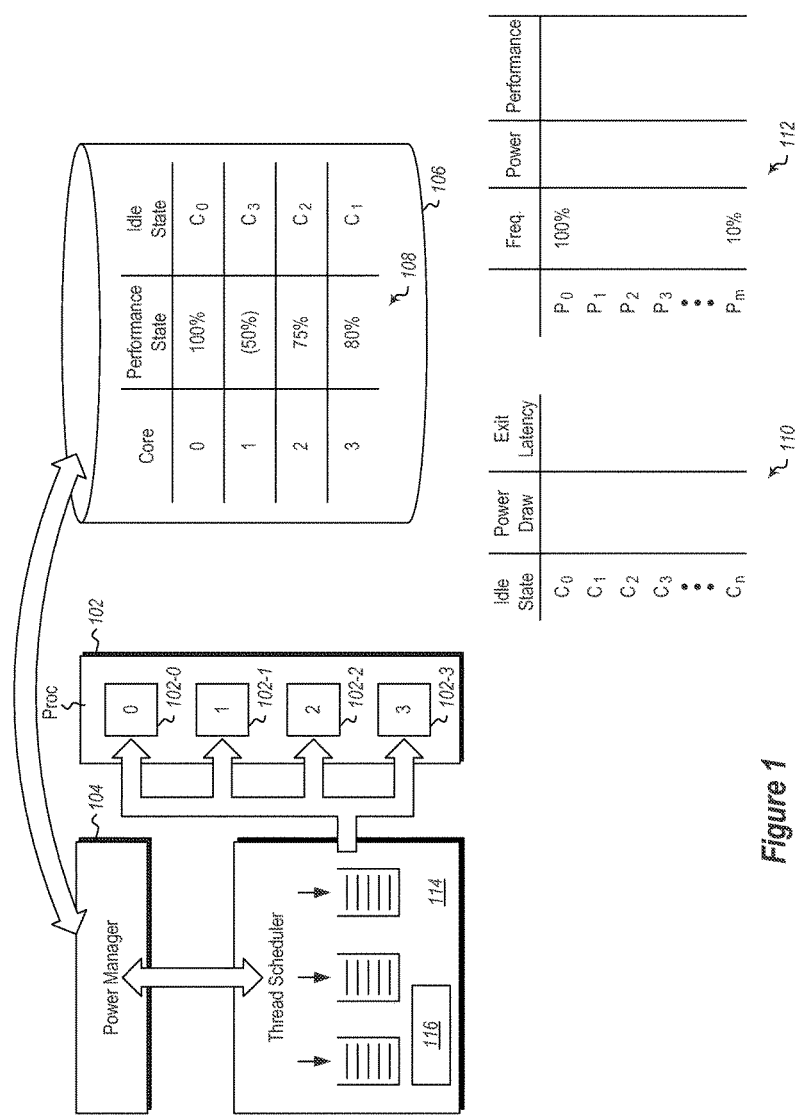
FIG. 1 illustrates a system with a plurality of processing units, a power manager and a thread scheduler that communicates with the power manager for scheduling threads on the plurality of processing units.

Reference is now made to FIG. 1. FIG. 1 illustrates a processor package 102. The processor package 102 includes a plurality of processing units. In the example illustrated, four processing units 102-0, 102-1, 102-2, and 102-3 are illustrated. However, in other embodiments, fewer or more processors may be implemented. A processing unit, as used herein, may be a processor core, hyperthread, or other processing unit. The processing units perform work by having threads scheduled to them.

The idle states and performance states of the processing units are controlled by a power manager 104. In particular, the power manager 104 can configure individual idle states and/or power states. The power manager can be implemented in hardware, firmware, or software. In some embodiments, the power manager 104 could be implemented in an operating system.

The following illustrates examples of idle states and performance states. In particular, ACPI defines processor idle states known as C-states and processor performance states known as P-states. In ACPI, the CPU idle states C0-C3 are defined as follows:

C0 is the operating state. Even though the processor is not actually "idle" in the C0 idle state, it is still classified as one of the ACPI idle states. C1 (often known as Halt) is a state where the processing unit is not executing instructions, but can return to an executing state essentially instantaneously. C2 (often known as Stop-Clock) is a state where the processing unit maintains all software-visible state, but may take longer to wake up. C3 (often known as Sleep) is a state where the processing unit does not need to keep its cache coherent, but maintains other state. Some processing units have variations on the C3 state (Deep Sleep, Deeper Sleep, etc.) that differ in how long it takes to wake the processing unit.

While a device or processing unit operates, such as by being in C0 idle state, it can be in one of several power-performance states. P0 is the highest-performance state, with P1, P2, . . . to Pm being successively lower-performance states. At P0, the processing unit operates at maximum power and frequency. P1 is lower performing than P0, typically due to lower voltage and/or frequency. P2 is less than P1 with voltage/frequency scaled. Etc.

The power manager 104 is associated with storage 106 which includes one or more storage entities which keep track of idle and performance states for the processing units 102-0, 102-1, 102-2, and 102-3. In the example illustrated, a performance/idle state table 108 represents these storage entities. In the example illustrated in FIG. 1, the performance/idle state table 108 includes a performance state entry for each processing unit identifying the frequency and/or voltage as a percentage of total frequency and/or voltage on a per processing unit basis. In some embodiments, this may be a current frequency and/or voltage value. However, embodiments may also include a most recent operating frequency and/or power value that represent the frequency and/or voltage when a processing unit was active. For example, processing unit 102-1 is in an idle state of C3 indicating that it is basically shut down and not operating. However, before being put in this state, the processing unit 102-1 was operating at 50%. This is demonstrated by the 50% being in parentheses. Thus, as used herein, a frequency and/or voltage value in parentheses in the performance/idle state table 106 indicates a most recent operating frequency and/or power value that represent the frequency and/or voltage when a processing unit was active, but that the processing unit is not currently operating at that frequency and/or power value.

The power manager 104 also has access to additional information related to idle states and performance states. For example, FIG. 1 illustrates an idle state table 110 and a performance state table 112.

The idle state table 110 includes information for multiple (i.e., three or more) idle states. In this example, the idle state table includes an entry for power draw and an entry for exit latency for each of the idle states. The power draw entry identifies the amount of power drawn by a processing unit when the processing unit is in the particular idle state. The exit latency is the amount of time it takes to bring a processing unit out of the particular idle state to a fully functioning idle state, i.e. in the present example, C0.

The performance state table 112 includes information for multiple performance states. In this example, the performance state table 112 includes an entry for frequency, an entry for power, and an entry for performance for each performance state. The frequency entry, in the illustrated example, identifies the percentage of total frequency at which a processing unit in the given performance state is operating. Thus, for example, a processing unit which has a maximum operating frequency of 1.5 GHz, operating at 80%, operates at 1.2 GHz. Some embodiments may additionally or alternatively include a voltage level entry identifying a voltage level (e.g. by percentage of maximum voltage, absolute value, or other value).

The power entry identifies the amount of power drawn by a processing unit operating in the given performance state. This is often expressed in terms of Watts.

The performance entry identifies any additional performance features associated with that performance state, including cache frequencies or sizes or associativities, or memory frequencies or widths, or specific offload engine characteristics, or features associated with any other hardware component with the capability to trade off power and performance.

Referring once again to FIG. 1, embodiments may include a thread scheduler 114. The thread scheduler 114 schedules work on the processing units 102-0 through 102-4. Embodiments may be implemented where the thread scheduler 114 communicates with the power manager 104. Communication between the thread scheduler 114 and power manager 104 can be used to improve a system's responsiveness. Communication between the thread scheduler 114 and power manager 104 can additionally or alternatively be used to improve a system's energy efficiency or energy savings.

The following illustrates various examples of communication that can take place between the thread scheduler 114 and power manager 104 to achieve the responsiveness and/or energy efficiency or energy savings. Energy efficiency, in this context, can be thought of as the amount of energy required (power*time) to accomplish a given task or set of tasks.

Traditionally a thread scheduler selects a processing unit on which to execute a ready thread through criteria such as the history of where the thread has previously been scheduled (to obtain "warm cache" benefits), the processing unit or a subset of processing units for which the thread has been affinitized (mandatory or optional), the distribution of currently-active processing units, and the locality of other associated resources (such as I/O or memory). Embodiments can improve these decisions by also (or alternatively) taking into account each processing unit's current idle state and/or performance state and/or the thread's expected performance characteristics. This is especially true when a processing unit can have multiple (i.e. three or more) different idle states and multiple performance states. For example, it may happen that a particular processing unit model flushes one or more of its associated caches when it is in a deep idle state (e.g., ACPI C-state C6). In such cases, cache locality advantages are reduced or removed and as such embodiment may determine that such processing units should have less weight given to them, or not be considered at all, when selecting a processing unit on which to schedule a thread.

To make thread scheduling decisions that are both performance and power aware, communication can be established between the thread scheduler 114 and the power manager 104 to communicate helpful information. Such information may include the power-performance profile of processing unit; a performance state that the processing unit is in; an idle power state that processing unit is in; exit latencies of the processing units from the idle states; power requirements for idle states, power requirements for performance states, etc. As noted above, the power manager 104 has this information available from the performance/idle state table 108, the idle state table 110 and the performance state table 112.

Thus the thread scheduler 114 can use knowledge of power-performance profiles as mentioned above and the power manager 104 can decide which performance and idle states processing units should be running at during a next power manager time quantum. In this context, the power manager time quantum can be thought of as the next (immediate future) interval of time in which the power manager will make no (or minimal) changes to the processing unit performance and idle states unless the state of the system changes in some way. The power manager 104 can provide the information about the current performance and idle states of the processing units to the thread scheduler 114 so that the thread scheduler 114 can consider this information as one of the inputs while making a thread scheduling decision.

Similarly, the power manager 104 can receive from the thread scheduler 114 (or any other entity in the system) information about the kind of activity that took place in a recently concluded power manager quantum or kind of activity that is going to take place in the immediate future, i.e. a next power manager quantum. This information can be used by the power manager 104 in its power manager decision making.

Characteristics of the threads can be used in multiple ways to improve thread scheduling decisions when combined with information provided by the power manager 104. For example, if a high priority thread is ready to run, the thread scheduler 114 may decide not to wake up a processing unit that is in deep idle state and instead run on a processing unit that is in shallow idle state, where deep or shallow is determined by exit latencies from that idle state. The thread scheduler 114 may even choose to preempt a low priority thread running at an active processing unit. This decision can also take a thread's last running time or average running time into account as one of the other inputs. Similarly, while choosing among active processing units, the thread scheduler 114 can take the performance state of the processing unit into account, if that information is available, to choose the processing unit on which to schedule a high priority thread. The thread scheduler 114 may even choose to preempt a low priority thread running on high performance state processing unit. By choosing a processing unit that is in 'active' state and/or in high performance state for a high priority thread, the thread scheduler 114 may improve system's responsiveness by finishing critical tasks sooner. Note that the concept of "priority" in this context does not refer to any specific implementation of thread priority, but rather indicates an abstract expectation that a thread's "priority" determines its importance (e.g., its requirement to complete quickly or successfully) relative to other threads.

Information 116 about threads than ran during a last power quantum can be maintained by the thread scheduler 114. The information gathered/maintained by scheduler can be communicated between the thread scheduler 114 and the power manager 104 to decide a system's (or processing unit's) performance and idle states. The thread scheduler 114 can maintain information such as how much time was spent at different priority levels such as real-time priority levels, foreground priority levels, background priority levels, and normal priority levels. If there is more work taking place at certain priority levels, the power manager 104 may bias the system's characteristics towards more performance while in other cases, it may tilt the balance towards energy conservation. Similarly, thread scheduler 114 may calculate how much time threads spent in ready states (that is, ready to be executed and waiting to be scheduled to a processing unit) during previous power manager quantum(s). Based on this information, the power manager 104 can decide how many processing units should be put in specific power and/or performance states.

The thread scheduler 114 may also expose a way (such as an API) for threads to indicate that those threads want to run at a processing unit that is running at higher performance state. As such, when the thread scheduler 114 selects an idle processing unit, it gives a preference to a processing unit running at high frequency. Alternatively the thread scheduler 114 may choose to give preference to a processing unit running at high frequency based on the priority of the thread, assuming that higher priority threads should finish their work faster to improve responsiveness. For this to happen, as noted above, there is communication between the power manager 104 and the thread scheduler 114.

In some embodiments, the thread scheduler 114 maintains fine grained information, such as a thread's running time when it gets scheduled or a thread's expected wait time when it gets de-scheduled. This information can be used as an input to the power manager 104 when deciding the performance and/or power state of the processing units. For example, if a thread is expected to run for a long time, the thread scheduler 114 can provide a hint to the power manager 104 to increase the performance state of a processor for the thread rapidly (or even choosing a highest performance state of a processor directly). Similarly, if a thread is expected to be ready to run after a brief amount of time (e.g., a few microseconds), the thread scheduler 114 may provide a hint to the power manager 104 to not to put a processing unit in a low power state as it is likely to be needed soon.

In some embodiments, characteristics from the system or workload(s) can be extracted and fed back to the power manager 104. For example, when something is changing on a screen, it could be interpreted that it is providing valuable information directly to the user and hence any adverse impact on the performance of the system in such a case would be negatively perceivable by user. Thus, embodiments may schedule threads to processing units so as to favor performance for the system, or at least the part of the system related to the screen updates. However, this could be done judiciously as well since small updates on the screen may not be providing valuable information to the user, so those small changes can be filtered out from more meaningful user interface changes. Other use cases can be identified when system needs higher performance. For example, application launch, application switching etc. may be causes where higher performance is desired to minimize impact on the user.

Other components in the system can provide information to the thread scheduler 114. For example, the system can provide information about quality of service (QoS). Such information may identify the QoS requirements associated with actions performed by a thread. Alternatively or additionally, embodiments may identify whether or not QoS commitments are being met or not. This information can be used to schedule threads on processors. For example, if QoS is not being met, threads can be scheduled to processing units operating at higher performance. If QoS is being met, it may be possible to schedule threads to lower performance processing units to conserve energy.

As an example of QoS considerations, a framework that is involved in a multimedia experience, e.g. media playback or live media capture, can provide feedback to the power manager 104 when its intended operation is running close to a deadline and hence the power manager 104 should tilt the balance in favor of performance until existing conditions are rectified. Similarly, a framework or system component that is responsible for system animations or final screen compositions can provide feedback to the power manager 104 that it needs more performance from the system to compose multiple surfaces.

Interrupts and deferred procedure calls (DPCs) are important work items that need to be processed in very performant manner because interrupts and DPCs are very high priority work items that can prevent other work from happening on the processing units until these complete their execution. If a platform and/or operating system allows that interrupts and DPCs can be directed to different processing units, processing units' performance and/or idle states can be taken into account to make a decision. On a system with multiple devices and/or multiple interrupt priority levels, interrupts' priority levels and processing units' performance and/or idle states both can be combinedly used to make a thread scheduling decision.

Interrupt and/or DPC steering decisions can also be made based on a trade-off decision between performance and energy efficiency or energy savings. For example, when performance is needed, interrupts and/or DPCs can be directed to processing unit(s) that are already in a high performance state. When energy efficiency or energy savings is important, interrupts and/or DPCs can be scheduled to processing units such that a performance state of the processing unit being a high performance state is not as important.

The factors discussed above and below can be used in a thread scheduling scheme based on weighting. In particular, the existence of certain factors or the degree of certain factors may cause inputs to thread scheduler decision making scheme to be weighted in a certain fashion. Thus, for example, a certain factor being present may cause a greater preference for high performance processing units, or low exit latency units. However, the weighting will not necessarily force selection of such processing units, rather simply cause them to be preferred while allowing for selection of other processing units when other factors cause weighted inputs to be input that favor lower power processing units.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
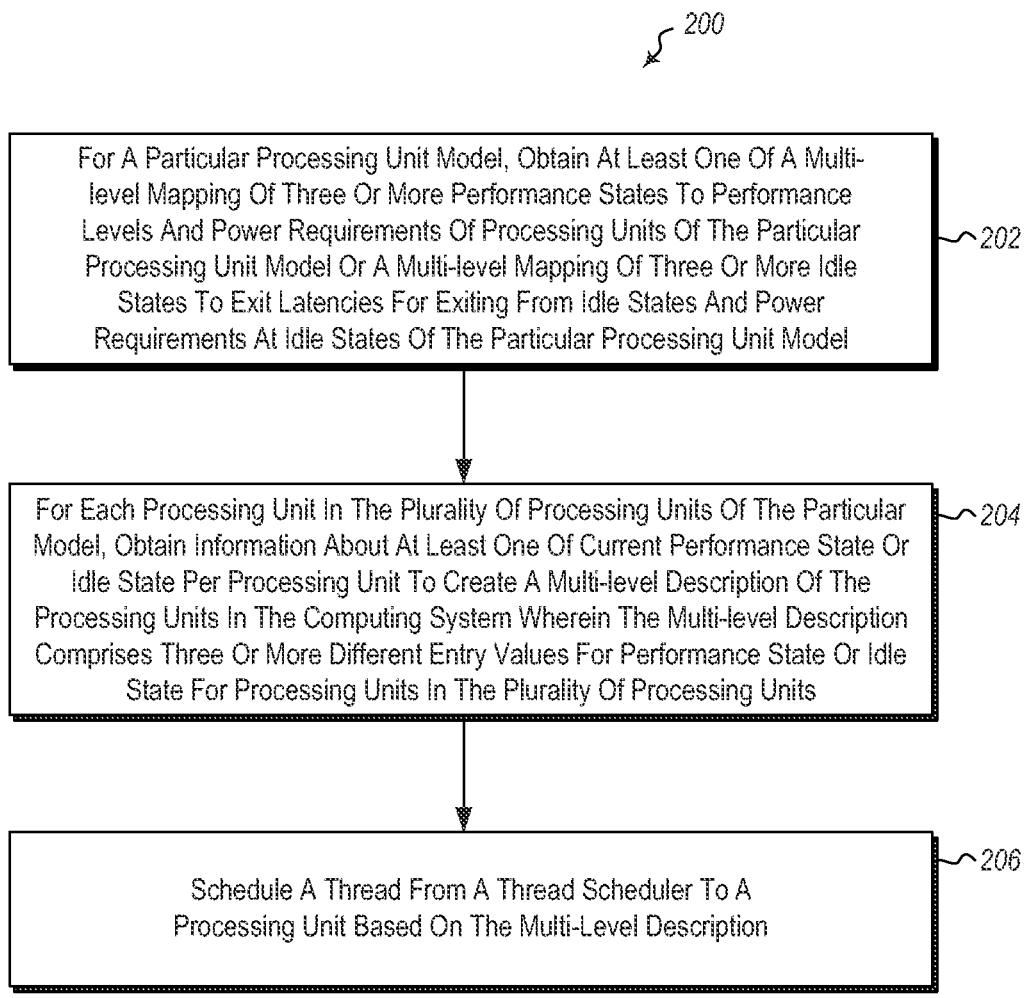
FIG. 2 illustrates a method of scheduling threads on the plurality of processing units.

Referring now to FIG. 2, a method 200 is illustrated. The method 200 may be practiced in a computing system that includes a plurality of processing units. The method 200 includes acts for scheduling threads on the plurality of processing units. The method 200 includes for a particular processing unit model, obtaining at least one of a multi-level mapping of three or more performance states to performance levels and power requirements of processing units of the particular processing unit model or a multi-level mapping of three or more idle states to exit latencies for exiting from idle states and power requirements at idle states of the particular processing unit model (act 202). For example, FIG. 1 illustrates an idle state table 110 and a performance state table 112 that may include this information. This information may be available to the power manager 104.

The method 200 further includes, for each processing unit in the plurality of processing units of the particular model, obtaining information about at least one of current performance state or idle state per processing unit to create a multi-level description of the processing units in the computing system (act 204). The multi-level description includes three or more different entry values at different levels for performance state or idle state for processing units in the plurality of processing units. Thus, for example, FIG. 1 illustrates the performance/idle state table 108 that is able to store different entry values for current performance state and/or idle state of various processing units. Examples of different values for different levels may be, for example, different idle state levels or different performance state levels. Thus, in the example illustrated in FIG. 1, the performance/idle state table 108 includes four entries for idle state, C0, C3, C2, and C1. Each of these entries has a different value representing a different level of a multi-level idle state mapping. Similarly, the performance/idle state table 108 includes four different entries with different performance state values. Each of these entries has a different value representing a different level of a multi-level performance state mapping. This information is available to the power manager 104.

The method 200 further includes scheduling a thread from a thread scheduler to a processing unit based on the multi-level description (act 206). For example, the power manager 104 can provide the thread scheduler 114 the information from performance/idle state table 108. The thread scheduler can use this information to schedule threads to one or more of the processing units 102-0, 102-1, 102-2, and 102-3.

The method 200 may be performed where scheduling a thread is based on priority of the thread. For example, if a thread meets or exceeds a particular priority characteristic (i.e., is a high priority thread), a processing unit being set at a having a higher performance state than another processing unit or being at an idle state with a lower exit latency than another processing unit in the plurality of processing units is selected for having the thread scheduled to it. Alternatively, if a thread is below a particular priority characteristic (i.e., is a low priority thread), scheduling may be less concerned with a processing units performance state having a high performance or its idle state having a low exit latency.

The method 200 may be performed where scheduling a thread is based on latency sensitivity of the thread. For example, the thread may be associated with a real time process where high latency is deleterious. Thus, for example, embodiments may weight threads requiring low latency to be scheduled to processing units having high performance characteristics or low exit latencies. If latency is not important, this can be de-emphasized in the scheduling process.

The method 200 may be performed where scheduling a thread is based on a quality of service (QoS) guarantee associated with the thread. For example, if a system is not operating at a contracted QoS, thread scheduling can emphasize high performance processing units or low exit latency processing units to improve the QoS. In contrast, if a system is far exceeding a contracted QoS, power and resources can be conserved by emphasizing lower performance processing units to lower system power requirements while still operating within a contracted QoS agreement.

The method 200 may be performed where scheduling a thread is based on an expected runtime duration of the thread. For example, past history of tasks may provide an indication of a runtime duration for a thread to be scheduled. As noted above, a thread with a short runtime can have scheduling that favors low exit latency or high performance processing units, or even scheduling that favors pre-empting other longer running threads already running on processing units. Longer runtimes may justify scheduling that favors higher exit latencies and/or lower performance processing units.

The method 200 may be performed where scheduling a thread is based on a desired performance for the thread. For example, additional metadata may be included that indicates that a thread should be run on a high performance processing unit. In some specific embodiments, a thread may have associated information that indicates the desired performance state for the thread.

The method 200 may be performed where scheduling a thread is based on a ready time metric for the thread. For example, a determination can be made as to the amount of time the thread has been waiting in the thread scheduler 114 to be scheduled. Threads that have long waiting times could be scheduled in a way that favors processing units with high performance, processing units with low exit latencies, and/or pre-emption of already executing threads.

The method 200 may be performed where scheduling a thread is based on user perceptibility of actions performed by the thread. For example if a thread is involved in operations that are quickly visible to a user, such as updating the screen, it could be scheduled in a way that favors processing units with high performance, processing units with low exit latencies, and/or pre-emption of already executing threads.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system comprising a plurality of processing units that correspond to a particular processing unit model, a method of scheduling threads on the plurality of processing units, the method comprising:
   obtaining a first record that includes three or more performance states associated with the plurality of processing units for the particular processing unit model, wherein each performance state comprises a performance level and a power requirement for one or more processing units of the particular processing unit model;
   obtaining a second record that includes a mapping of three or more idle states associated with the plurality of processing units, wherein each idle state comprises an exit latency for exiting from the idle state and a power requirement at the idle state for the one or more processing unit of the particular processing unit model;
   correlating the information from the first record with the information from the second record to identify both a performance state and an idle state for at least one processing unit of the plurality of processing units for the particular processing unit model; and
   scheduling a thread from a thread scheduler for execution on at least one of the plurality of processing units based on at least both the performance state information from the first record and the idle state information from the second record.

2. The method of claim 1, wherein the one or more thread characteristics include the priority of the thread.

3. The method of claim 1, wherein the one or more thread characteristics includes the a quality of service (QoS) guarantee associated with the thread.

4. The method of claim 1, wherein the one or more thread characteristics includes an expected runtime duration of the thread.

5. The method of claim 1, wherein the one or more thread characteristics includes a desired performance for the thread.

6. The method of claim 1, wherein the one or more thread characteristics includes a ready time metric for the thread.

7. The method of claim 1, wherein the one or more thread characteristics includes user perceptibility of actions performed by the thread.

8. The method of claim 1, wherein the one or more thread characteristics includes weighting information from the second table.

9. The method of claim 1, wherein a first performance state of the performance states identifies a processing unit operating at maximum voltage and frequency, and a second performance state of the performance states identifies a processing unit operating at less than maximum power or frequency.

10. A computing system comprising:
    a plurality of processing units of one or more models configured to perform work by having threads assigned to the processing units;
    a thread scheduler coupled to the plurality of processing units, wherein the thread scheduler is configured to schedule threads to the processing units in the plurality of processing units;
    a power manager coupled to the thread scheduler, wherein the power manager is configured to control at least the performance states of the processing units, wherein the thread scheduler maintains a first record and a second record, the said first record including three or more performances states associated with the plurality of processing units for a particular processing unit model, each said performance state comprising a performance level and a power requirement for one or more processing units of the particular processing unit model, and the said second record including a mapping of three or more idle states associated with the plurality of processing units, each said idle state comprising an exit latency for exiting from the idle state and a power requirement at the idle state for the one or more processing unit of the particular processing unit model wherein the power manager is coupled to the thread scheduler for providing the first table and the second table to the thread scheduler; and
    wherein the thread scheduler is configured to correlate the information from the first record with the information from the second record to identify both a performance state and an idle state for at least one processing unit of the plurality of processing units for the particular processing unit model, and to schedule threads to be executed by the processing units in the plurality of processing units based at least on the description table of the processing units in the computing system and based at least both the performance state information from the first record and the idle state information from the second record.

11. The system of claim 10, wherein the thread scheduler is configured to schedule threads to the processing units in the plurality of processing units based on priority of the thread.

12. The system of claim 10, wherein the thread scheduler is configured to schedule threads to the processing units in the plurality of processing units based on a quality of service (QoS) guarantee associated with the thread.

13. The system of claim 10, wherein the thread scheduler is configured to schedule threads to the processing units in the plurality of processing units based on an expected runtime duration of the thread.

14. The system of claim 10, wherein the thread scheduler is configured to schedule threads to the processing units in the plurality of processing units based on a desired performance for the thread.

15. The system of claim 10, wherein the thread scheduler is configured to schedule threads to the processing units in the plurality of processing units based on a ready time metric for the thread.

16. The system of claim 10, wherein the thread scheduler is configured to schedule threads to the processing units in the plurality of processing units based on user perceptibility of actions performed by the thread.

17. The system of claim 10, wherein the thread scheduler is configured to schedule threads to the processing units in the plurality of processing units based on weighting information from the description table.

18. The computing system of claim 10, wherein a first performance state of the performance states identifies a processing unit operating at maximum voltage and frequency, and a second performance state of the performance states identifies a processing unit operating at less than maximum power or frequency.

19. A system for scheduling threads on a plurality of processing units that correspond to a particular processing unit model, the method comprising:
 one or more processors; and
 one or more computer-readable media, wherein the one or more computer-readable media comprise computer-executable instructions that when executed by at least one of the one or more processors cause at least one of the one or more processors to perform the following:
  obtaining a first record that includes three or more performance states associated with the plurality of processing units for the particular processing unit model, wherein each performance state comprises a performance level and a power requirement for one or one or more processing units of the particular processing unit model;
  obtaining a second record that includes a mapping of three or more idle states associated with the plurality of processing units, wherein each idle state comprises an exit latency for exiting from the idle state and a power requirement at the idle state for the one or more processing unit of the particular processing unit model;
  correlating the information from the first record with the information from the second record to identify both a performance state and an idle for at least one processing unit of the plurality of processing units for the particular processing unit model; and
  scheduling a thread from a thread scheduler for execution on at least one of the plurality of processing units based on at least both the performance state information from the first record and the idle state information from the second record.

20. The system of claim 19, wherein scheduling a thread is based on weighting information from the second table.

* * * * *